Dec. 28, 1937.  F. M. M. B. SALOMON  2,103,643
DEVICE ADAPTED TO ELIMINATE OSCILLATIONS
Filed March 31, 1933  4 Sheets-Sheet 1
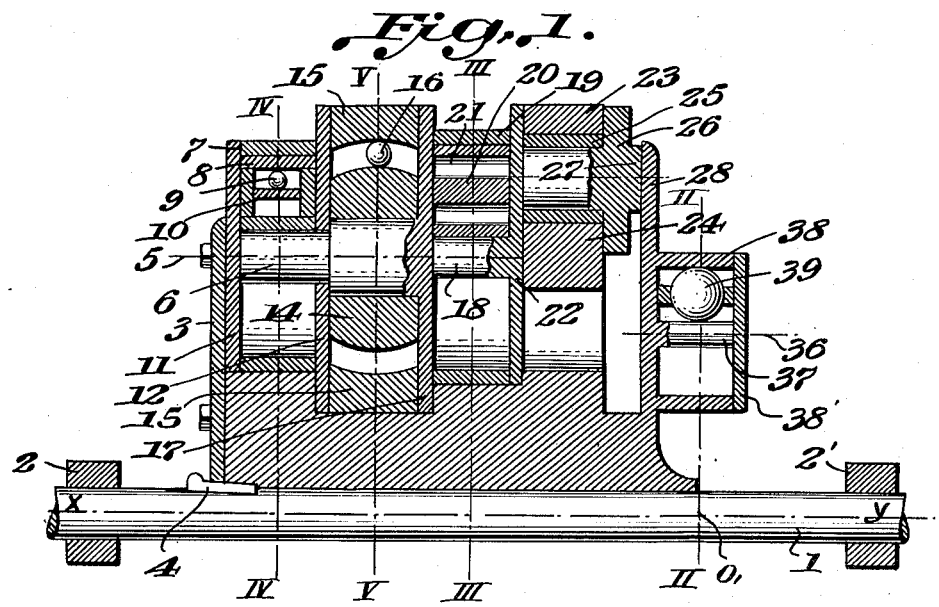
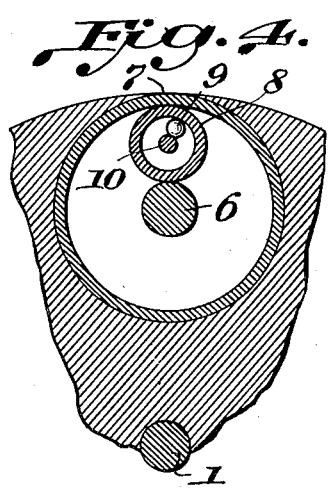
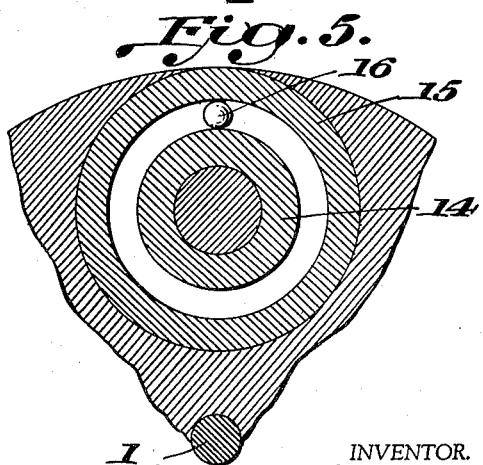
INVENTOR.
F. M. M. B. Salomon,
BY Glascock Downing Seebold
ATTORNEYS.

Dec. 28, 1937.  F. M. M. B. SALOMON  2,103,643
DEVICE ADAPTED TO ELIMINATE OSCILLATIONS
Filed March 31, 1933  4 Sheets-Sheet 2
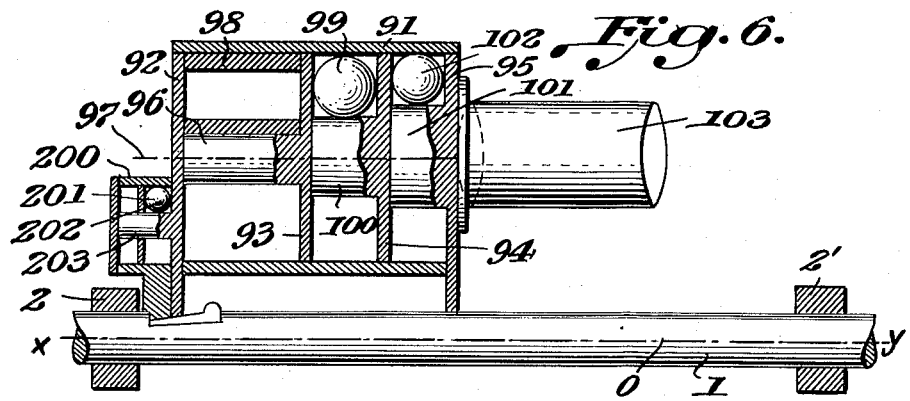
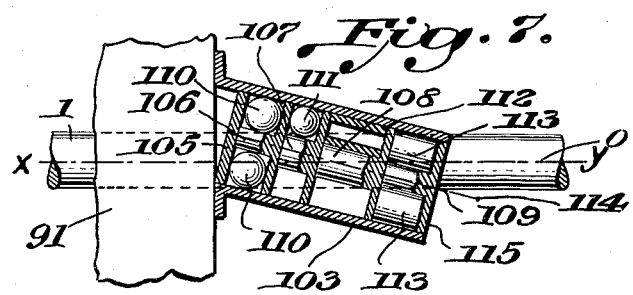
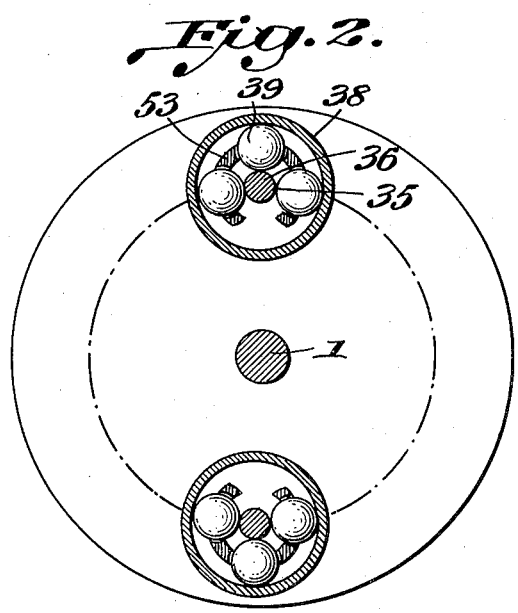
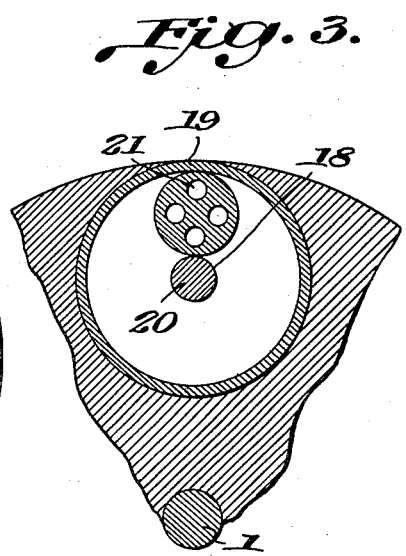
INVENTOR.
F.M.M.B.Salomon
BY: Hascock Downing Seibold
ATTORNEY.

Dec. 28, 1937.  F. M. M. B. SALOMON  2,103,643
DEVICE ADAPTED TO ELIMINATE OSCILLATIONS
Filed March 31, 1933  4 Sheets-Sheet 3
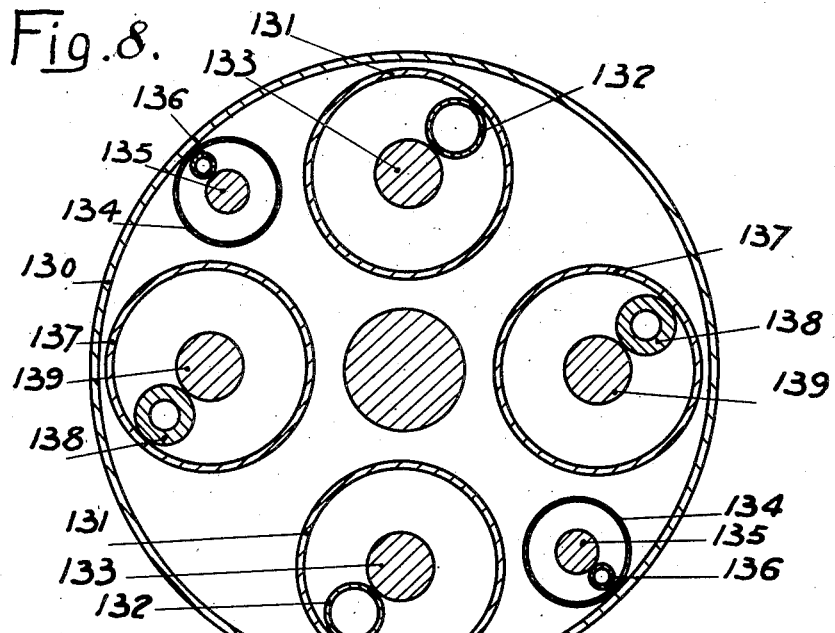
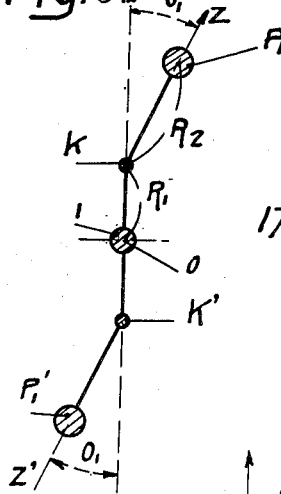
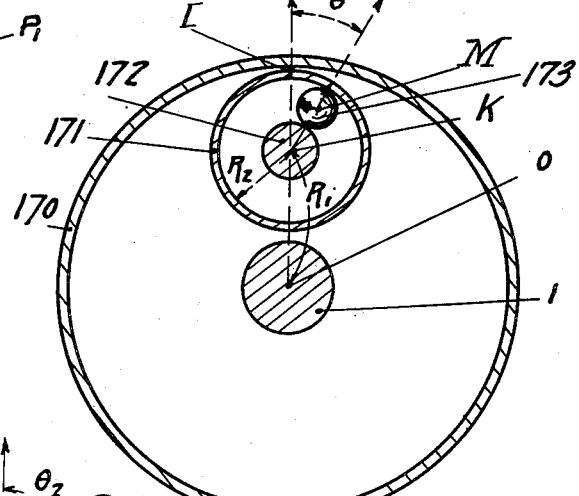
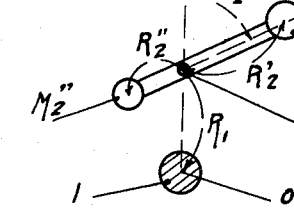
F. M. M. B. Salomon
INVENTOR
By Marks & Clark
Attys.

Dec. 28, 1937.   F. M. M. B. SALOMON   2,103,643
DEVICE ADAPTED TO ELIMINATE OSCILLATIONS
Filed March 31, 1933   4 Sheets-Sheet 4
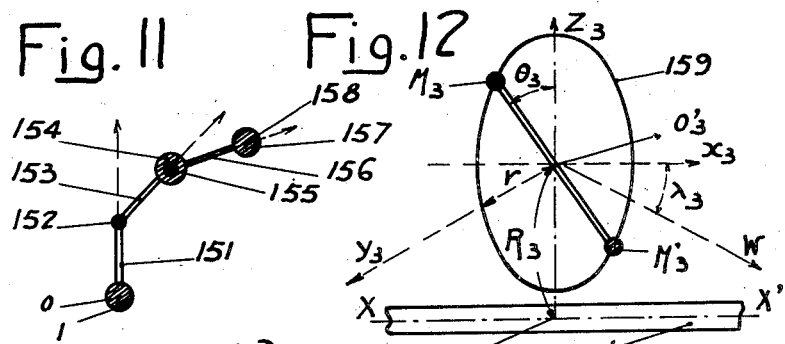

Patented Dec. 28, 1937

2,103,643

UNITED STATES PATENT OFFICE 2,103,643

DEVICE ADAPTED TO ELIMINATE OSCILLATIONS

François Marie Michel Bernard Salomon, Paris, France

Application March 31, 1933, Serial No. 663,866
In France April 7, 1932

22 Claims. (Cl. 74—574)

Devices are known which are adapted to reduce speed oscillations, vibrations and jerks arising simultaneously or not through the action of forces, periodical or not, on any systems and chiefly on continuously rotating shafts.

In the case of rotary shafts it has been proposed to use not only rigid fly-wheels, but also fly-wheels comprising movable masses adapted to oscillate when speed oscillations occur. In many cases springs begin acting with these movable masses or else the part played by these springs is played by gravity.

Oscillation-damping systems making use eventually of fluids are also known which act together through their inertia and through their frictional action (or through their viscosity, this term being taken in its most general sense).

These known arrangements are intricate and have a low efficiency.

My invention provides the elimination of parasitical oscillations, of vibrations and jerks through the mere play of transformations of kinetic energy consisting in a suitable combination of radial inertia forces and tangential inertia forces exerted on auxiliary masses termed hereinafter "filtering masses" without any pivotal connections, springs, brakes or stops of any kind, so as to reduce to a minimum the friction arising. The masses are perfectly free in their recesses. The term "filtering masses" proposed for them is given by reason of the similarity disclosed hereinafter with electric filters.

Sufficient account has not been taken in the prior systems comprising a plurality of masses, of the variations of active force and of kinetic momentum of these masses as they move round their centers of gravity.

Not only does my invention take these variations into account for making the necessary corrections, but it also provides means for making a profitable use of said variations.

I have shown in accompanying drawings, by way of example, several forms of execution of my invention.

The description will now refer more specifically to the cycle regularization of the rotary movement of a shaft termed "main shaft". However it should be well understood that some of the devices disclosed cover more specially the elimination or reduction of vibrations than this cyclic regularization of a rotary movement.

My invention may be applied to the most varied purposes. It allows the replacement of the usual fly wheels adapted to regularize the movement of machine shafts for stationary machines, rail and road vehicles of all kinds, ships, airships, by means of much lighter fly wheels than heretofore while retaining or even increasing the cyclic regularity.

My invention is applicable to all branches of industry, piston motors of all types, piston pumps of all types and even turbines, electric machines, kinematographic machine mechanisms, presses, rolling mills and the like.

It is not limited to the cyclic regularization of a rotary shaft, but allows also the elimination of vibrations of all kinds, such as torsional or sagging (flexional) vibrations in machine shafts.

The devices according to my invention may be arranged at different points of the shafts, and in particular to the front or rear of a shaft, of a motor or pump crankshaft or else they may be distributed at different points of these shafts.

It should also be well understood that the disturbing torques to be eliminated may be of any origin and be produced by the driving torque, the resisting torque or any other cause.

In accompanying drawings:

Fig. 1 is a cross-sectional longitudinal view of half an arrangement according to my invention keyed to a shaft for regularizing the torque and eliminating the vibrations.

Fig. 1a is an explanatory diagram.

Figs. 2, 3, 4, 5 are cross-sections of Fig. 1 through lines II—II, III—III, IV—IV, V—V.

Fig. 6 shows a modification wherein the shaft is provided with the same devices disposed in a slightly different manner.

Fig. 7 is a detail plan view of certain elements of Fig. 6.

Fig. 8 is a cross-section of a further modification.

Figs. 9, 10, 10a, 11, 12, 13 are diagrams intended to provide an explanation of the principles underlying the invention.

Fig. 14 shows the application of the invention to a shaft which is to be protected against sagging as illustrated in Fig. 1a.

Fig. 15 is an explanatory diagram.

Fig. 16 relates to the case of disturbances of small frequency with reference to the angular speed of the main shaft.

Referring to Fig. 1, the transmission shaft 1, held in the bearings 2 and 2' carries a fly wheel 3 secured through the key 4 and carries a series of devices having a common axis 5 and another device having an axis 36.

A first device comprises a cylindrical stubshaft 6 the axis of which is shown at 5 and round which is arranged a torus-shaped recess. In this recess a mass such as a roller 8 is adapted to move with a very small play, said roller being urged centrifugally against the race 7 at the inner periphery of the recess. A plate and a washer 12 prevent the roller from escaping laterally.

The roller 8 is hollow and has a solid axis 10 and torus-shaped recess wherein a ball 9 may move, with a very small radial play.

Fig. 4 which is a cross-section of Fig. 1 along line IV—IV shows the arrangement of the roller 8 and of the inner ball 9.

As the mathematical theory will be discussed later, I will now limit myself to a short explanation, sufficient for the understanding of the principle. Under the action of the radial centrifugal forces, the roller 8 has a tendency to remain at its outermost position shown in Fig. 4.

The disturbing torques, whether driving or resistant, exerted on shaft 1, produce fluctuations of angular speed and eventually torsional oscillations for this shaft and the roller rocks on either side of its position of equilibrium with a frequency equal to that of the disturbances.

The ball 9 which may be omitted in certain cases, rocks in a similar manner on either side of its point of relative equilibrium.

The movements of the roller and ball have a tendency to oppose the causes producing them and all the more so as certain dynamic conditions disclosed in detail hereinafter are more exactly satisfied.

These conditions correspond substantially, when friction is supposed negligible, to conditions of resonance for which the compound roller and ball system which is equivalent to a double pendulum, has two natural periods of oscillation for the relative motion and under the action of the radial centrifugal forces, as near as possible the periods $T_1$ and $T_2$ of two of the periodical disturbances to be eliminated. I may also use a treble, quadruple pendulum.

Returning to Fig. 1, a further oscillating system which protects the shaft 1 against periodical disturbances of period $T_3$, comprises an inner guiding stubshaft constituted by a part having a substantially torus-shaped surface 14 having a double curvature. This stubshaft guides a ball 16 rolling under the action of the centrifugal forces over the outer double curvature surface 15. These elements are shown in section in Fig. 5. A washer 17 prevents the ball from escaping.

Returning again to Fig. 1, the device adapted to eliminate the disturbances of period $T_4$ comprises a cylindrical stubshaft 18 having its axis at 5, with an outer race 19 and a movable roller 20 provided with cylindrical perforations 21.

This arrangement is shown in Fig. 3, which is a cross-section through III—III. The cylindrical perforations serve for modifying the ratio between the outer radius $r$ of the roller and its radius of gyration $\rho$; when the perforations are disposed towards the outside of the roller, the radius of gyration decreases while if they are placed nearer the axis of the roller, it increases.

Reverting again to Fig. 1, there is shown a further similar system, separated from the last described by a washer 22 and adapted to eliminate perturbations having a period $T_5$. This system comprises an inner cylindrical stubshaft 24 disposed inside a recess and a cylindrical race 23 for a roller urged against said race centrifugally. This roller is constituted by a tube 25 and a cover 26 integral therewith the diameter of which is larger than that of the tube in order to give the movable part, a sufficiently considerable momentum of inertia with reference to its own axis of rotation for reasons disclosed hereinafter. This cover has a head 27 of smaller diameter for reducing the friction between this head and a plate 28 serving for holding laterally the roller constituted by the parts 25—26—27 which are integral one with another.

Lastly, the disturbances of period $T_6$ are eliminated by the system having its axis at 36 and comprising a stubshaft 37, the balls 39 the race 38, the closure washer 38'. Fig. 2 shows a cross-section thereof through line II—II and illustrates moreover the cage 53 similar to a ball bearing cage and containing several balls 39. I have shown by way of example an arrangement with three balls.

Figs. 9, 10, 10a, 11, 12, 13, 15, and 16 of the accompanying drawings are intended to support the theoretical disclosure given hereinafter.

The systems provided according to my invention are equivalent to composed pendular systems and consist of solid, granular, or fluid masses freely moving under the action of centrifugal forces inside races eccentrically formed in a fly wheel.

In addition to the reaction of the races, the movable masses are submitted in their relative movement to radial forces of inertia or radial centrifugal forces.

It can be said that the masses move in a field of radial centrifugal forces produced by the rotation of the shaft 1.

Each movable mass is not really assimilable to a point and does not form a simple pendulum. It forms a sort of compound pendulum moving in the field of radial centrifugal forces and is submitted moreover to tangential actions. However, for sake of clearness, it is of interest to disclose first the principal results obtained by myself in the complete analytical study I have made of the case of a simple pendulum, before describing more general cases.

Fig. 9 relates to a simple pendulum driven by the shaft 1. This shaft is integral with a crank pin OK to the end K of which is pivotally secured a pendulum $KP_1$ the axis of which is OZ.

I will suppose its mass $m$ is concentrated at $P_1$ I write $$\overline{OK}=R_1 \text{ and } \overline{KP_1}=R_2$$

the angle between the axis $OZ'$ of OK and the axis OZ will be termed $\theta_1$. A symmetrical system $OK'$ $P_1'$ balances the system $OKP_1$. If it is desired to keep perfectly constant the angular speed $\alpha'$ of the shaft 1 in spite of the presence of a disturbing torque $C \sin wt$, C being a constant, $t$ time and $w$ the pulsation of the disturbance, the speed $\alpha$ will remain equal to a constant $\alpha_0'$, supposing the friction is negligible for the movements of the pendulum, if the radii $R_1$ and $R_2$ satisfy substantially the condition:

(1) $$\frac{R_1}{R_2}=\left(\frac{W}{\alpha_0'}\right)^2$$

This condition is one of resonance, which remains always true when the speed $\alpha'$ varies as in most applications the ratio between a disturbing pulsation $w$ and the angular speed $\alpha'$ is constant.

In such a case, an adjustment which is correct for a speed $\alpha'$ remains true when $\alpha'$ varies. The preceding results suppose that friction is absent. It is possible, in practice, to obtain very small friction and the forms of execution shown hereinafter correspond to this requirement.

I have studied the problem completely, taking into account friction and I have come to the following results:

I will admit for greater simplicity that the resistant torque due to friction in the relative movement (Fig. 9) is proportional to the angular speed of oscillation $\theta_1'$ and may be taken equal to $-S\theta'$, S being a constant.

In such a case it is impossible to obtain a constant angular speed $\alpha' = \alpha_0'$ when a disturbing torque $C \sin wt$ is applied to the shaft $1$. I obtain a value $\alpha' = \alpha_0 + \alpha w \sin(wt - \varphi)$, $\alpha$ and $\varphi$ being constants for given conditions of working. The elongation $\theta_{max}$ is equal to $$\frac{mR_2(R_1+R_2)\alpha w}{\sqrt{S^2+u^2}}$$

$u$ being equal to $$mR_2^2 w - \frac{mR_1R_2\alpha_o'^2}{w}$$

In the general case of S different from zero the following expression should be made minimum $$H = \frac{S^2 + u^2}{S^2 + (u - mR_2^2 w)^2}$$

which provides the optimum adjustment, of which the condition of resonance $u=0$ for $S=0$ is a particular case.

I will first remark that according to the Equation (1) which supposes the friction is negligible the ratio $$\frac{R_1}{R_2}$$

increases in proportion with the square of the order of the harmonics of the disturbances.

In other words, to harmonics of a high order should correspond systems arranged far from the shaft $1$ having recesses of small radius for the masses.

Such an arrangement may be executed as shown in Fig. 15. To this theoretical Figure 15 may correspond in practice, a device such as that shown in Fig. 16 with a fly-wheel $170$ secured to the shaft $1$ by a key $174$, a cylindrical recess $171$ the axis of which is at $K_1$, a cylindrical core $172$ having its axis at $K$ and a ball $173$ having as a radius $r$.

Supposing $OK = R_1$ and $R_2$ is the inner radius of the race, the correspondences between Fig. 16 and Fig. 9 are obvious.

It is explained hereinabove that the condition of resonance (1) corresponding to a simple pendulum and negligible friction must be altered to take into account certain dynamic elements of the movable mass moving round its center of gravity, to wit inter alia its mass and its radius of gyration.

I will now show the influence of the active force of the masses as they move round the center of gravity as may be understood from inspection of Fig. 10a wherein are diagrammatically disclosed the main elements of Fig. 16 and some of the elements of Fig. 9.

Fig. 10 shows the shaft $1$, its axis O, the axis K common to the stubshaft $172$ and the race $171$ and the movable mass $173$ having a radius $r$. If I designates the momentum of inertia $m\rho^2$ of this mass with reference to its center of gravity S, if $\alpha'$ is the angular speed of the shaft $1$, $\theta$ the angle of oscillation of the mass $173$ on either side of the point of equilibrium I, if lastly a disturbing torque $C \sin wt$ (C being a constant) is applied during the normal working of the shaft $1$, and $p$ is the order of the harmonic of the disturbance.

I have found that the optimum condition is given by the formula:

$$\overline{OK} = p^2\left(1 + \frac{\rho^2}{r^2}\right)KM$$

If this condition is satisfied for a given speed of a motor for instance, it remains satisfied for any other speed inside the limits of the approximations made as long as $$\frac{w}{\alpha_0'}$$

is constant.

It is of interest to examine the values of the ratio $$\frac{w}{\alpha_0'}$$

in the most frequent cases of industrial practice.

It is generally of interest to reduce as much as possible the radius of gyration. This may be obtained by providing perforations in the movable masses in their parts most remote from the axis. In particular I may bore cylindrical channels.

The case of a pendulum with two punctual masses should be studied. Fig. 10a, relating to this case, shows a pendulum the axis of oscillation $K_1$ of which is at a distance $R_1$ from the axis 0 of the shaft $1$. It comprises two masses supposed to be punctual masses $M_2'$ and $M_2''$ at distances $R_2'$ and $R_2''$ from the axis $K_1$ and the values of which are $m'$ and $m''$.

The angle $\theta_2$ gives the inclination $M_2''$, $M_2'$ with reference to $OK_1$.

The condition of resonance providing the optimum condition are with the preceding approximations $$R\frac{m'R_2' - m''R_2''}{m'R_2'^2 + m''R_2''^2} = \left(\frac{w}{\alpha_0'}\right)^2$$

For eliminating simultaneously disturbances of different pulsations it is possible to make simultaneously use of different oscillating systems tuned each to a given pulsation; but it is sometimes of advantage to use a system having a greater number of degrees of liberty, two for instance if it forms a double pendular system.

Fig. 11 is a theoretical figure which shows a double pendulum. A crank pin $151$ secured to the shaft $1$ carries a pivot $152$ for the rod $153$ carrying a mass $155$ to which is pivotally secured a rod $156$ ending with a mass $158$. The centers of the masses are at $155$ and $158$.

The analytic theory is similar to that given for the simple pendulum; but there are always two natural frequencies of vibration and these are made to coincide with the frequencies of the disturbances to eliminate. It is possible as stated hereinabove to use treble, quadruple ... pendular systems.

I will now disclose the principles according to which the most favourable dynamic conditions are provided in the case of movable masses oscillating in planes the perpendiculars to which make with the axis of shaft $1$ an angle $\lambda$ different from zero.

The right hand side of Fig. 6, Fig. 7 and lastly the theoretical Figure 12 relate to this last case.

Fig. 12 shows two equal masses $M_3$ and $M_3'$ rigidly secured together and adapted to oscillate along the circle $159$ having a radius $r_3$ on either side of their position of equilibrium under the action of the centrifugal forces generated by the rotation of the shaft 1.

The normal $O_3'w$ to the circle 159 at its center $O'$ makes an angle $\lambda_3$ with the axis $O_3'x_3$ parallel to the axis XY of the shaft 1. I suppose $O_3O_3'$=R, $O_3O_3'$ being perpendicular to XY.

The frictional stresses being supposed negligible I have shown analytically the optimum or tuning condition is $$\frac{w}{\alpha_0'} = \sin \lambda_3$$

which shows the interest of this form of execution of my invention for pulsations which are small with reference to the speed of rotation of the shaft 1.

It is necessary to underline the deep similitude between the movable mass systems constituted by induction coils, condensers and if required mutual induction coils, as used for electrotechnical purposes under the name of "electric filters".

I have proved that this similarity is not a mere appearance, but corresponds to a parallelism between the two analytical theories. This is the reason why I term the movable masses I use "filtering masses".

Fig. 6 shows a modification in the arrangement of the parts adapted to eliminate the disturbances, such as irregularities in speed, or vibrations of different kinds exerted on the shaft 1.

A first cylindrical tube 91 termed "filtering tube" comprises the geometrical axis 97, the cylindrical stubshaft 96, the hollow roller 98 rolling against the inside of tube 91 serving as a race therefor, and the closure washers 92 and 93. This device is adapted to eliminate further disturbances having a period $T_7$.

For eliminating disturbances having a period $T_8$, the tube 91 contains a further cylindrical stubshaft 100 with a ball 99 rolling over 91 and a closure washer 94; for eliminating disturbances having a period $T_9$ it also contains another cylindrical stubshaft 101, a ball 102 rolling over the surface of 91 and a terminal washer 95.

As apparent the common axis 97 for the three devices described is parallel to the axis XY of the shaft 1.

For eliminating certain disturbances, it is on the contrary of advantage to arrange the axis of the "filtering" tube obliquely with reference to this axis.

In Fig. 6 I have shown in a conventional perspective manner such a tube at 103, the axis of which makes an angle $\lambda$ with the axis XY of the main shaft. I have only shown the outline of the tube 103 in Fig. 6 without any connection with the main shaft.

Fig. 7 shows this tube 3 in horizontal projection with the stubshafts 106—107—108—109 contained therein.

These stubshafts guide respectively the balls 110—111, the tubular roller 112 and the rollers 113. The tube is closed by the washers 105 and 115.

The dynamic properties of such an arrangement oblique with reference to the main shaft are given out hereinafter.

Obviously the different systems described may be arranged at any points of the shafts to be protected against irregularities of angular speed or vibrations.

Thus, for instance a fly-wheel provided with such devices and which I will term a "filtering fly-wheel" may, in an automobile motor, be placed in front of the motor, near the starting crank-shaft or else near the clutch at the point where the shaft passes out of the motor or else in the middle of the motor.

However for an efficient elimination of the torsional oscillations of the crankshaft it is often of interest to dispose the different arrangements according to my invention near the points where the oscillations arise, i. e. near the head of each connecting rod.

Fig. 8 shows by way of example one of the plates of a crank shaft in which are disposed a number, three in the example shown, of systems with freely moving masses according to invention. These systems comprise each two parts symmetrical with reference to the shaft. Each device is adapted to eliminate a disturbance of given period.

The first device comprises the stubshafts 133, the tubular rollers 132 and the tubes 131, serving as races. The second device comprises the stubshafts 139, the tubular rollers 138 and the races 137.

The third device comprises the stubshafts 135, the tubular rollers 136 and the races 134.

The calculation of the geometric and dynamic elements such as the ratio between the radius of gyration of each roller to its outer radius are effected according to the principles disclosed hereinafter.

Fig. 1a is a diagram adapted to explain the action against sagging of a system such as that disclosed hereinabove i. e. the second from the left in Fig. 1 which comprises a ball 16 and a double curvature race 15.

I have shown in Fig. 1a a shaft 1 deformed by such a sagging.

The ball 16 exerts a centrifugal action $f$ the momentum of which with reference to the point $S_1$ has a tendency to straighten the shaft 1.

Fig. 14 relates to the case where a certain number of devices similar to the device just mentioned are arranged along the shaft 1 at distances $l_1, l_2 \ldots$ from one another, which distances may be equal or not. These devices give the shaft a sort of "centrifugal rigidity" similar to a "gyroscopic rigidity".

I have shown in Fig. 14, the double curvature races 167, the balls 168, and the stubshafts 169. The fly-wheels are secured through keys 164.

What I claim is:

1. A system for damping oscillations in a rotary shaft comprising at least one autonomous movable mass on which is formed a bearing surface forming part of the general surface of the movable mass, guideways cooperating with each of said bearing surfaces, means whereby the shaft carries said guideways along with it in its rotation, each mass being adapted to rock freely, autonomously, unobstructedly and unrestrainedly with substantially zero friction under the combined action of the centrifugal forces produced by the rotation of the shaft and of the disturbing oscillations acting on said shaft while the bearing surface of each mass moves over its guideway, auxiliary guiding means adapted to cooperate with each mass and means whereby the shaft carries the auxiliary guiding means along with it in its rotation.

2. A system for damping oscillations in a rotary shaft comprising a first series of at least one solid one-part movable mass on which is formed a bearing surface forming part of the general surface of the movable mass, guideways cooperating with each of said bearing surfaces, means whereby the shaft carries said guideways along with it in its rotation, a second series of at least one solid one-part movable mass, each mass of the second series being adapted to remain in contact with at least one mass of the first series, each mass of the second series and each mass of the first series being adapted to rock freely, unobstructedly and unrestrainedly with substantially zero friction under the combined action of the centrifugal forces produced by the rotation of the shaft and of the disturbing oscillations acting on said shaft while the bearing surfaces of the masses of the first series move over their guideways and the masses of the second series move over the masses of the first series with which they remain in contact.

3. A system for damping oscillations in a rotary shaft, comprising a plurality of autonomous movable masses on which is formed a plurality of bearing surfaces forming part of the movable masses, guideways cooperating with each of said bearing surfaces and means whereby the shaft carries the guideways along with it in its rotation, each mass being adapted to rock freely, autonomously, unobstructedly and unrestrainedly with substantially zero friction under the combined action of the centrifugal forces produced by the rotation of the shaft and of the disturbing oscillations acting on said shaft while the bearing surface of each mass moves over its guideway, some of said masses being at different distances from the shaft, having different weights and following different guideways.

4. The device as claimed in claim 3 in which the masses are arranged by groups of equal weight and equal distance from the shaft but the weight and distance of the members of different groups differ from the weight and distance of the members of another group.

5. The device as claimed in claim 3 in which the masses are arranged by groups of equal weight and equal distance from the shaft but the weight and distance of the members of different groups differ from the weight and distance of the members of another group, and in which guideways of the masses are different.

6. Means for damping oscillations in a rotatable shaft comprising a curved guideway carried by and rotatable with the shaft, said guideway being eccentric with respect to the axis of rotation of said shaft, and two relatively movable members, one said member having substantially frictionless rolling relation with said guideway and the other said member having substantially frictionless rolling engagement with the first said member, one, at least, of said members constituting a damping mass.

7. Means for damping oscillations in a rotatable shaft comprising a first member movable relative to said shaft, a curved guideway carried by and rotatable with the shaft, said guideway being eccentric with respect to the axis of rotation of said shaft, and a second member having substantially frictionless rolling engagement with both the first said member and the guideway, one, at least, of said members constituting a damping mass.

8. Means for damping oscillations in a rotatable shaft comprising a part fastened to and rotatable with said shaft, a first member carried by but movable relative to said part, said member having formed therein a curved guideway, eccentric with respect to the axis of rotation of said shaft and a second member having substantially frictionless rolling engagement with said guideway, one, at least, of said members constituting a damping mass.

9. Means for damping oscillations in a rotatable shaft comprising a part fastened to and rotatable with said shaft, and two members supported by said part, one of which has formed therein a curved guideway along which the other said member is adapted to roll, said guideway being eccentric to the axis of rotation of said shaft and said two members being movable relatively to each other and to said part, and one, at least, thereof constituting a damping mass.

10. A system for damping oscillations in a rotatable shaft comprising a movable member on which is formed a bearing surface forming part of the general surface of said member, a guideway cooperating with said bearing surface, means whereby the shaft carries said guideway along with it in its rotation, a movable mass in contact with said movable member, said member and said mass being adapted to rock freely and with substantially zero friction, under the combined action of centrifugal forces produced by the rotation of the shaft and of the disturbing oscillations acting on said shaft, with the bearing surface of said movable member moving over its guideway and the mass moving over the bearing surface of the movable member.

11. A system for damping oscillations in a rotatable shaft comprising a movable roller member on which is formed a bearing surface forming part of the general surface of said roller member, a guideway cooperating with said bearing surface, means whereby the shaft carries the guideway along with it in its rotation, a movable mass in contact with said movable roller member, said member and said mass being adapted to rock freely and with substantially zero friction, under the combined action of centrifugal forces produced by the rotation of the shaft and of the disturbing oscillations acting on said shaft, with the bearing surface of the roller member rolling over the guideway and the mass rolling over the roller member with which it remains in contact.

12. A system for damping oscillations in a rotatable shaft comprising a movable member on which is formed a bearing surface forming part of the general surface of said member, a guideway cooperating with said bearing surface, means whereby the shaft carries said guideway along with it in its rotation, said member being adapted to rock freely and with substantially zero friction under the combined action of centrifugal forces produced by rotation of the shaft and of the disturbing oscillations acting on said shaft while the bearing surface moves over its guideway, auxiliary guiding means adapted to cooperate with said movable member, and means whereby the shaft carries the auxiliary guiding means along with it in its rotation.

13. Means for damping oscillations in a rotatable shaft comprising a part fixed to and rotatable with said shaft, said part being provided with at least one arcuate guideway the center of curvature of which is eccentric to the axis of rotation of said shaft, and a freely rolling structurally integral damping mass movable substantially frictionlessly along said guideway in the direction of and in response to shaft vibrations.

14. Means for damping oscillations in a rotatable shaft comprising a part fixed to and rotatable with said shaft, said part having formed therein at least one opening the center of curvature of which is eccentric to the axis of rotation of said shaft, and a freely rolling structurally integral damping mass of circular cross-section engaging in said opening to roll substantially frictionlessly along the wall thereof in the direction of and in response to shaft vibrations.

15. Means for damping oscillations in a rotatable shaft comprising a part fixed to and rotatable with said shaft, said part having formed therein at least one opening the center of curvature of which is eccentric to the axis of rotation of said shaft, and a freely rolling structurally integral damping mass of circular cross-section engaging in said opening to roll substantially frictionlessly along the wall thereof in the direction of and in response to shaft vibrations, the radius of curvature of the wall-engaging portion of said mass being less than the radius of curvature of the opening wall.

16. Means for suppressing torsional vibrations of known frequency in rotating shaft systems comprising a part carried by and rotatable with the shaft, said part having formed therein at least one guideway the center of curvature of which is eccentric to the axis of rotation of the shaft, and a structurally integral balancing mass of circular cross-section engaging with and freely rollable along said guideway, said mass and guideway being so related in size and shape as to endow the mass with a free vibration frequency synchronous with the frequency of the torsional vibrations of the shaft when the mass is displaced from a condition of equilibrium.

17. In means for damping vibrations in a rotatable member, a guideway carried by and rotating with said member, the center of curvature of said guideway being eccentric to the axis of rotation of the member, and a structurally integral damping mass adapted to freely roll directly on said guideway, the center of gravity of said mass being freely shifted by the vibrations imparted to said member, and the rolling motion of the mass being adapted to cause the same to oscillate freely around its center of gravity, the natural period of oscillation of said mass under the action of centrifugal forces being substantially equal to that of the disturbing forces acting on the rotatable member.

18. Means for damping oscillations in a rotatable shaft comprising a part fixed to and rotatable with said shaft, said part being provided with at least one arcuate guideway the center of curvature of which is eccentric to the axis of rotation of said shaft, and a structurally integral damping mass freely movable substantially frictionlessly along said guideway in the direction of and in response to shaft vibrations, and in response to centrifugal force.

19. Means for damping oscillations in a rotatable shaft comprising a part fixed to and rotatable with said shaft, said part being provided with a cylindrical guideway, the center of curvature of which is eccentric to the axis of rotation of said shaft, and a tubular damping mass freely movable substantially frictionlessly on said guideway under the action of centrifugal force and shaft vibrations.

20. Means for damping oscillations in a rotatable shaft comprising a part fixed to and rotatable with said shaft, said part carrying a cylinder, the center of curvature of the surface of which is eccentric to the axis of rotation of the shaft, and a freely movable, tubular damping mass adapted for engagement with said cylinder, said mass being rigid and responsive to centrifugal force and shaft vibration.

21. Means for damping oscillations of a rotatable shaft comprising a member operatively secured to said shaft for rotation therewith, said member including a cylindrical portion rigid therewith and having an external bearing surface, the axis of said cylindrical portion being parallel to and displaced from the axis of rotation of said shaft, and a damping mass freely movable relative to said member and shaft in response to shaft vibration, said damping mass having a cylindrical bearing surface engageable with the bearing surface of said cylindrical portion, the latter being effective to guide said damping mass in its movement relative to said part and shaft and the radius of curvature of the bearing surface on said cylindrical portion being smaller than the radius of curvature of the bearing surface on said damping mass.

22. Means for damping oscillations of a rotatable shaft comprising a member rigidly secured to and rotatable with said shaft, said member having guiding means rotatable therewith and comprising a cylindrical portion having an external bearing surface, the axis of said cylindrical portion being parallel to and spaced radially from the axis of rotation of said shaft, and a damping mass freely and arcuately movable relative to said member and shaft in response to shaft vibrations, said damping mass having a cylindrical bearing surface engageable with the bearing surface of said cylindrical portion and having a greater radius of curvature than said last-named bearing surface, the centers of curvature of said bearing surfaces being displaced from each other and the axis of rotation of said shaft.

FRANÇOIS MARIE MICHEL
BERNARD SALOMON.